(12) United States Patent
Kamaya et al.

(10) Patent No.: US 9,128,187 B2
(45) Date of Patent: Sep. 8, 2015

(54) DETECTION OF A POSITION OF AN OBJECT

(75) Inventors: Yamato Kamaya, Tokyo (JP); Satoru Nishi, Tokyo (JP); Makoto Tanibayashi, Shinjyuku (JP); Takashi Yonezawa, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 13/593,673

(22) Filed: Aug. 24, 2012

(65) Prior Publication Data

US 2013/0082877 A1 Apr. 4, 2013

(30) Foreign Application Priority Data

Sep. 29, 2011 (JP) ................. 2011-214212

(51) Int. Cl.
*G01S 3/02* (2006.01)
*G01S 13/87* (2006.01)
(52) U.S. Cl.
CPC ............. *G01S 13/874* (2013.01); *G01S 13/878* (2013.01)
(58) Field of Classification Search
CPC ....... G01S 13/08; G01S 13/02; G01S 13/874; G01S 13/878
USPC ......................... 342/463, 464, 146
See application file for complete search history.

(56) References Cited

U.S. PATENT DOCUMENTS 6,335,685 B1    1/2002  Schrott et al.
6,900,762 B2 *  5/2005  Andrews et al. ............... 342/463
(Continued)

FOREIGN PATENT DOCUMENTS

JP    2007080102    3/2007
JP    2007225448    9/2007
(Continued)

OTHER PUBLICATIONS

Kosuke Imai, "Probability", retrieved on Jan. 2, 2015 from the Internet: <URL:http://imai.princeton.edu/teaching/files/probabilityuG.pdf>, 26 pages.
JPO Office Action dated Jan. 20, 2015, IDS material, 3 pages.

*Primary Examiner* — Harry Liu
(74) *Attorney, Agent, or Firm* — Schmeiser, Olsen & Watts, LLP; John Pivnichny

(57) ABSTRACT

A method and associated system for estimating a position of an object. A radio wave is received from each radio frequency identification (RFID) tag of N RFID tags affixed to the object at different positions at the object (N≥2). A position of each RFID tag is detected from the received radio waves. A position of each RFID tag is estimated from analysis of the detected positions. The estimating includes utilizing, for n=1, 2, ..., N, a specified probability function $P('p_n|p_n)$ denoting a probability that the estimated position of RFID tag n is $'p_n$ if the detected position of RFID tag n is $p_n$, wherein $'p_n$ and $p_n$ are vectors from an origin of a coordinate system to the detected position and the estimated position, respectively, of the RFID tag n. The position of the object is ascertained from analysis of the estimated positions.

20 Claims, 6 Drawing Sheets

(56) References Cited

U.S. PATENT DOCUMENTS

| | | | |
|---|---|---|---|
| 7,170,412 B2 * | 1/2007 | Knox et al. | 340/572.1 |
| 7,633,377 B2 | 12/2009 | Sadr | |
| 8,072,311 B2 * | 12/2011 | Sadr et al. | 340/10.1 |
| 2006/0092040 A1 * | 5/2006 | Fishkin et al. | 340/825.49 |
| 2008/0074270 A1 | 3/2008 | Ashwood-Smith et al. | |
| 2010/0172502 A1 | 7/2010 | Jones et al. | |
| 2010/0245046 A1 * | 9/2010 | Stevens et al. | 340/10.1 |
| 2012/0157006 A1 * | 6/2012 | Hong et al. | 455/67.14 |

FOREIGN PATENT DOCUMENTS

| | | |
|---|---|---|
| JP | 4237657 | 3/2009 |
| JP | 2009288255 | 12/2009 |
| JP | 2010008237 | 1/2010 |
| JP | 2010096734 | 4/2010 |
| JP | 2010139325 | 6/2010 |
| JP | 2011520097 | 7/2011 |
| WO | 2007081128 | 7/2007 |

* cited by examiner

DETECTION OF A POSITION OF AN OBJECT

TECHNICAL FIELD

The present invention relates to a system for detecting the position of an object using a radio frequency identification (RFID) tag and an apparatus for detection.

BACKGROUND

An example of a known technique for detecting the position of an object is a system that includes a position detecting antenna and a shelf-wireless tag which are disposed on each shelf being an object. The IDs of the wireless tags affixed to the shelves are registered for each shelf in advance in a shelf tag management table in a position management server. A position detecting section in the position management server determines the position of each shelf, using identifying information received from wireless tags affixed to other shelves by the position detecting antenna disposed on each shelf and data stored in the shelf tag management table.

BRIEF SUMMARY

The present invention provides a method for estimating a position of an object, said method comprising:

receiving a radio wave from each radio frequency identification (RFID) tag of N RFID tags affixed to the object at different positions at the object, wherein N is at least 2;

detecting, from the received radio waves, a position of each RFID tag;

estimating, by a processor, a position of each RFID tag from analysis of the detected positions, wherein said estimating comprises utilizing, for n=1, 2, . . . , N, a specified probability function $P('p_n|p_n)$ denoting a probability that the estimated position of RFID tag n is $'p_n$ if the detected position of RFID tag n is $p_n$, and wherein $'p_n$ and $p_n$ are vectors from an origin of a coordinate system to the detected position and the estimated position, respectively, of the RFID tag n; and said processor ascertaining the position of the object from analysis of the estimated positions.

The present invention provides a system for estimating a position of an object, said system comprising:

means for receiving a radio wave from each radio frequency identification (RFID) tag of N RFID tags affixed to the object at different positions at the object, wherein N is at least 2;

means for detecting, from the received radio waves, a position of each RFID tag;

means for estimating a position of each RFID tag from analysis of the detected positions, wherein said estimating comprises utilizing, for n=1, 2, . . . , N, a specified probability function $P('p_n|p_n)$ denoting a probability that the estimated position of RFID tag n is $'p_n$ if the detected position of RFID tag n is $p_n$, and wherein $'p_n$ and $p_n$ are vectors from an origin of a coordinate system to the detected position and the estimated position, respectively, of the RFID tag n; and means for ascertaining the position of the object from analysis of the estimated positions.

The present invention provides a system comprising a receiving unit and a control unit collectively configured to perform a method for estimating a position of an object, said receiving unit coupled to the control unit, said method comprising:

said receiving unit receiving a radio wave from each radio frequency identification (RFID) tag of N RFID tags affixed to the object at different positions at the object, wherein N is at least 2;

said receiving unit detecting, from the received radio waves, a position of each RFID tag;

estimating, by a processor of the control unit, a position of each RFID tag from analysis of the detected positions, wherein said estimating comprises utilizing, for n=1, 2, . . . , N, a specified probability function $P('p_n|p_n)$ denoting a probability that the estimated position of RFID tag n is $'p_n$ if the detected position of RFID tag n is $p_n$, and wherein $'p_n$ and $p_n$ are vectors from an origin of a coordinate system to the detected position and the estimated position, respectively, of the RFID tag n; and said processor ascertaining the position of the object from analysis of the estimated positions.

DETAILED DESCRIPTION

Figure 1:
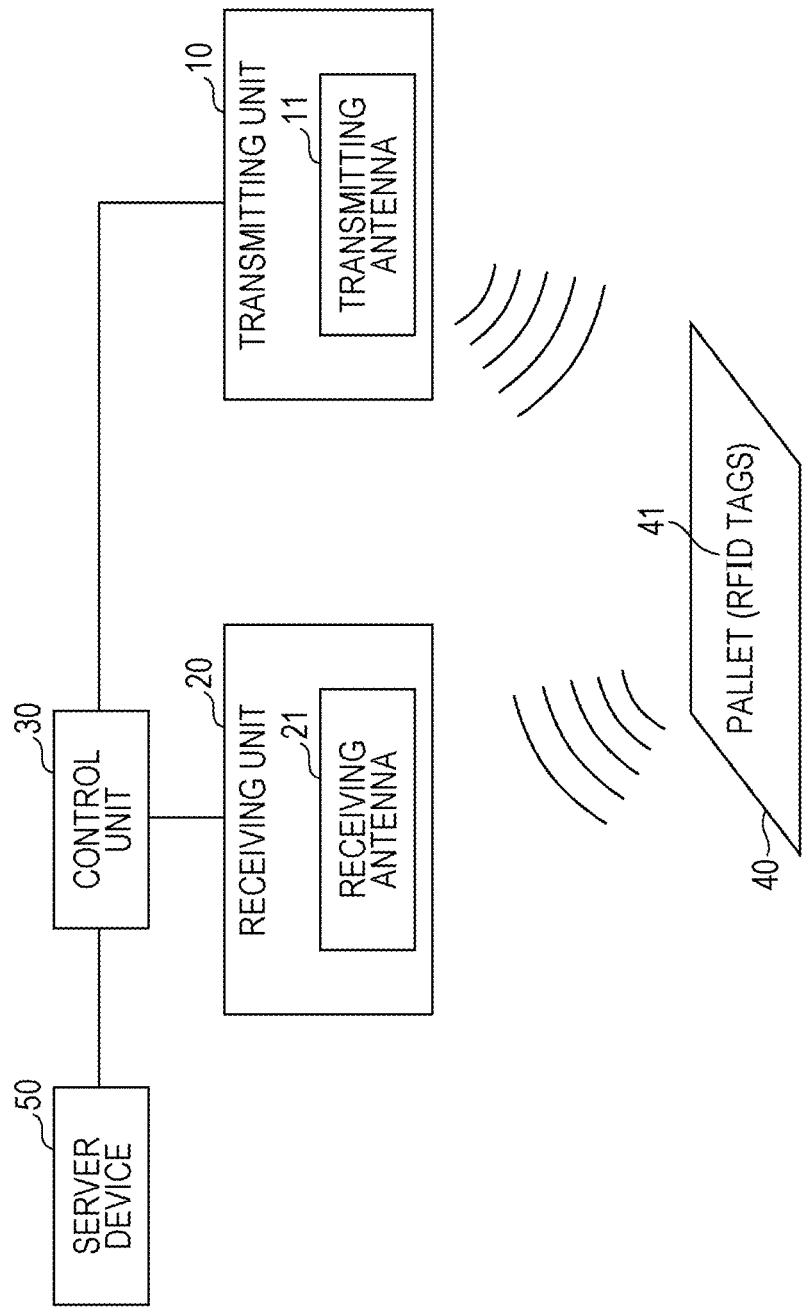
FIG. 1 illustrates an example of the configuration of a position detection system, in accordance with embodiments of the present invention.

Embodiments of the present invention will be described in detail below with reference to the accompanying drawings.

The use of a directional receiving device, such as a phased array antenna, as a receiving device (receiver) that receives a radio wave transmitted from an RFID tag enables not only simply detecting the presence or absence of an RFID tag but also detecting the position of an RFID tag that has transmitted a radio wave. However, if the distance between an RFID tag that has transmitted a radio wave and the receiving device is long, an error in detection of the position is large.

The present invention provides a mechanism that achieves an improved accuracy of detecting the position of an object provided with RFID tags without changing the functions of an RFID tag or the functions of a receiving device itself.

The present invention provides a system for reading a radio frequency identification (RFID) tag and includes one or more transmitting antennas that each transmits a radio wave for exciting the RFID tag, a directional receiving antenna, a receiving section, and a processor. The receiving antenna receives a radio wave transmitted from the excited RFID tag. The receiving section receives radio waves from a plurality of RFID tags affixed to an object in a previously identified positional relationship through the receiving antenna and detects a position of each of the plurality of RFID tags having transmitted the radio waves. The processor obtains information about the RFID tags using the radio waves received by the receiving antenna and calculates a position of the object provided with the plurality of RFID tags, a direction of a normal to a plane identified by the plurality of RFID tags, and an angle of rotation around the normal using a maximum likelihood estimation approach on the basis of information on the position of each of the plurality of RFID tags detected by the receiving section and a probability distribution of errors in the detection of the positions of the RFID tags by the receiving section.

The present invention provides an apparatus for detecting a position of an object provided with radio frequency identification (RFID) tags. The apparatus includes a receiving section and a processor. The receiving section receives radio waves transmitted from the plurality of RFID tags affixed to the object in a previously identified positional relationship and detects a position of each of the plurality of RFID tags having transmitted the radio waves. The processor calculates the position of the object provided with the plurality of RFID tags on the basis of information on the positions of the plurality of RFID tags detected by the receiving section.

The present invention provides an apparatus for reading a radio frequency identification (RFID) tag. The apparatus includes a directional receiving antenna, a receiving section, and a processor. The receiving section receives radio waves transmitted from a plurality of RFID tags affixed to an object in a previously identified positional relationship through the receiving antenna and detects a position of each of the plurality of RFID tags having transmitted the radio waves. The processor obtains information about the RFID tags using the radio waves received by the receiving antenna and calculates a position of the object provided with the plurality of RFID tags on the basis of information on the position of each of the plurality of RFID tags detected by the receiving section.

With the present invention, a system for detecting the position of an object provided with RFID tags can improve the accuracy of detecting the position.

The present invention is applicable to various systems configured to detect the position of an object provided with RFID tags. Here, as one example of such systems, a system for detecting the position of a pallet on which things are stacked, the pallet being an object, using radio waves transmitted from RFID tags affixed to the pallet is described below.

FIG. 1 illustrates an example of the configuration of a position detection system, in accordance with embodiments of the present invention.

The position detection system illustrated in FIG. 1 includes a transmitting unit 10, a receiving unit 20, and a control unit 30. These units function as an apparatus for reading an RFID tag, as described below. An object whose position is to be detected by the system is a pallet 40. The pallet 40 is provided with a plurality of RFID tags 41 in predetermined positions (see FIG. 3). The control unit 30 is connected to a server device 50 over connection means, such as a local area network (LAN).

The transmitting unit 10 (power supply section) includes a transmitting antenna 11 for transmitting a radio wave. The transmitting unit 10 transmits a radio wave for exciting each of the RFID tags 41 on the pallet 40 and supplies power to the RFID tag 41 under the control of the control unit 30. The position detection system according to the present embodiment can include one or more transmitting units 10. When the plurality of transmitting units 10 are included, they are arranged such that one transmitting unit 10 is assigned to a space having a specific size in accordance with the distance to the RFID tag 41 at which the transmitting unit 10 can excite it or other factors. Specifically, for example, the transmitting units 10 can be spaced uniformly. When the plurality of transmitting units 10 are included, they are sequentially driven one by one.

The receiving unit 20 receives a radio wave transmitted from an RFID tag 41 excited by power supplied from the transmitting unit 10. The receiving unit 20 includes a directional receiving antenna 21, such as a phased array antenna. Thus the receiving unit 20 can not only detect the presence or absence of the RFID tag 41 and but also measure the position of the RFID tag 41 having transmitted a radio wave with some degree of accuracy. That is, the reception of a radio wave from the RFID tag 41 by the directional receiving antenna 21 enables identifying the position of the RFID tag 41, that position being the position at which the radio wave has been transmitted.

The control unit 30 controls the transmitting unit 10 so as to make the transmitting unit 10 transmit a radio wave for exciting the RFID tag 41. When the system includes the plurality of transmitting units 10, the transmitting units 10 are made to sequentially transmit radio waves in a predetermined order at predetermined time intervals. The control unit 30 analyzes radio waves received by the receiving unit 20 and calculates (estimates) the position of the pallet 40 provided with the RFID tags 41 having transmitted the radio waves (an object whose position is to be detected). The control unit 30 is also connected to the server device 50 and transmits information, such as a time of reception of a radio wave from each of the RFID tags 41 and a result of estimation of the position of the pallet 40, to the server device 50.

Figure 2:
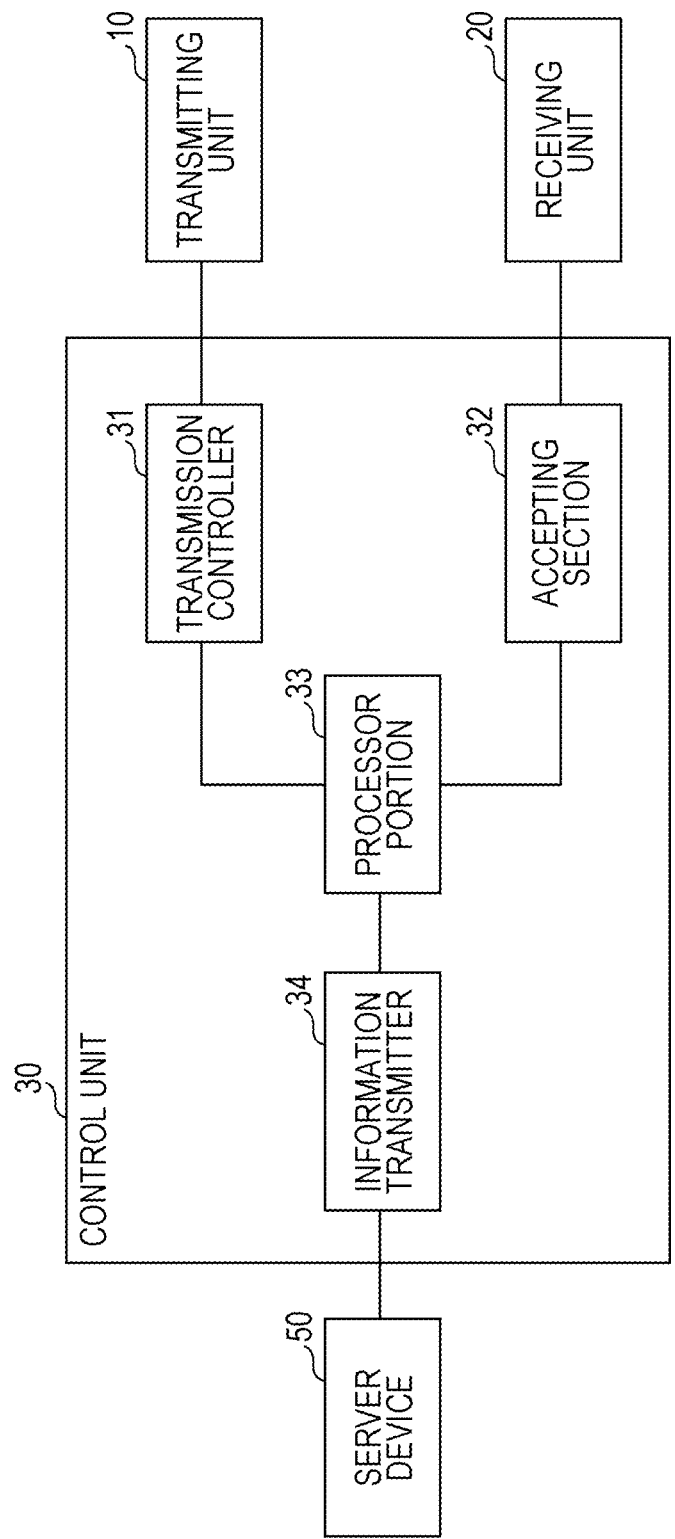
FIG. 2 illustrates an example of the functional configuration of a control unit, in accordance with embodiments of the present invention.

FIG. 2 illustrates an example of the functional configuration of the control unit 30, in accordance with embodiments of the present invention.

As illustrated in FIG. 2, the control unit 30 includes a transmission controller 31, an accepting section 32, a processor 33, and an information transmitter 34. The transmission controller 31 controls transmission of a radio wave from the transmitting unit 10. The accepting section 32 accepts an electric signal, the electric signal being output from the receiving unit 20 in response to a radio wave. The processor 33 analyzes a signal accepted by the accepting section 32 and calculates (estimates) the position of the pallet 40. The information transmitter 34 transmits information, such as a result of analysis (a result of estimation) conducted by the processor 33, to the server device 50.

The pallet 40 is a platform on which items (things) are stacked when it is used and is an object whose position is to be detected by the position detection system to which the present embodiment is applied. Although the single pallet 40 is illustrated in FIG. 1, in actuality, a plurality of pallets 40 may be objects whose positions are to be detected. Typically, the shape and size of a pallet, which is a platform, have various standards. In the present embodiment, the case where the pallet is a planar member having the shape of a square of side 1 m is described as an example.

Figure 3:
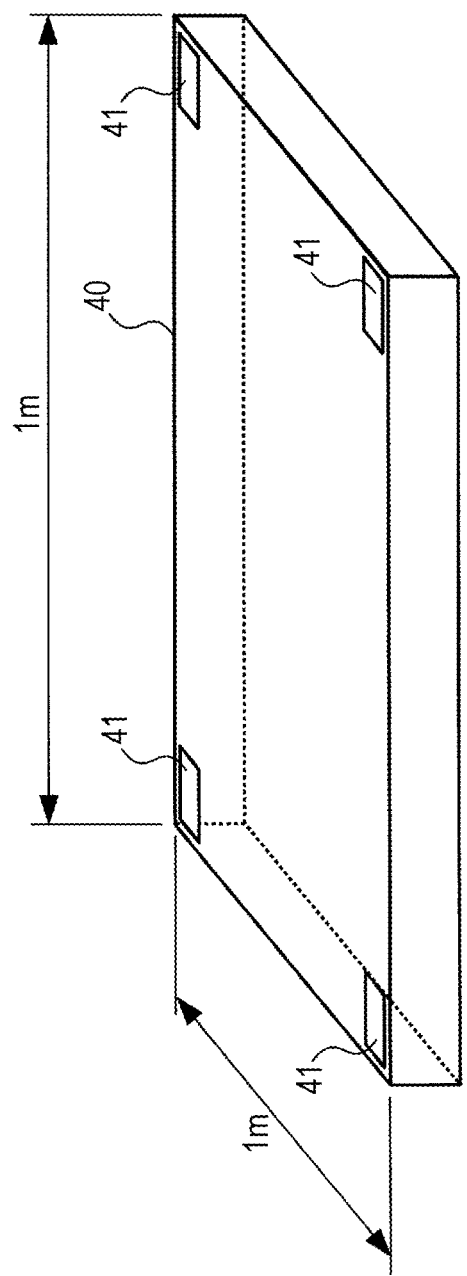
FIG. 3 illustrates an example of the configuration of a pallet, in accordance with embodiments of the present invention.

FIG. 3 illustrates an example of the configuration of the pallet 40, in accordance with embodiments of the present invention.

As illustrated in FIG. 3, the pallet 40 is provided with a total of four RFID tags 41 each at one of the four corners. In the present embodiment, each of the RFID tags 41 is a passive tag excited by power supplied from the transmitting unit 10. Because each of the RFID tags 41 has identifying information, they can be individually identified. Identifying the RFID tags 41 enables identifying the pallet 40 provided with the RFID tags 41.

The server device 50 obtains information from the control unit 30 and stores it in storage means, such as a magnetic disk device. The stored information is used in inventory control for items stacked on the pallet 40 and other management.

The position detection system illustrated in FIG. 1 is merely an example of a system to which the present embodiment is applied and is not intended to limit the system configuration to which the present embodiment is applicable. The present embodiment is widely applicable to a system for detecting the position of an object provided with the RFID tags 41. The transmitting unit 10 and the receiving unit 20 are separately arranged in the system configuration illustrated in FIG. 1. Alternatively, for example, the present embodiment may also be applied to a system that uses a general RFID reader having both the function of transmitting radio waves for supplying power to the RFID tags 41 and the function of receiving radio waves transmitted from the RFID tags 41. The RFID tag 41 in the present embodiment is a passive tag. Alternatively, the present embodiment may also be applied to a system that uses an active tag having an internal power supply and transmitting a radio wave using its power.

Next, a method of calculating the position of the pallet 40 according to an embodiment of the present invention is described.

As described above, the RFID tag 41 is affixed on each of the four corners of the pallet 40 having the shape of a square of side 1 m. Each of the RFID tags 41 has identifying information that allows the RFID tag 41 to be identified. In the following description, when it is necessary to discriminate among the four RFID tags 41, their reference numerals have the indexes 1 to 4 and they are represented as the RFID tag 41-1, RFID tag 41-2, RFID tag 41-3, and RFID tag 41-4.

The position of each of the RFID tags 41 and the pallet 40 is identified by coordinates set in a certain space in a range in which the receiving unit 20 can receive a radio wave transmitted from the RFID tag 41 (hereinafter referred to as a target space). Here, the position of the pallet 40 is assumed to be identified by the position of the center point (coordinate values) of the pallet 40. The attitude (orientation and angle of rotation) of the pallet 40 is also identified, and the details thereof are described below.

As described above, the use of the directional receiving antenna 21 in the receiving unit 20 enables measuring the positions of the RFID tags 41 having transmitted radio waves. However, the accuracy of that measurement has some degree of error. Thus the positions of the RFID tags 41 are represented by a certain probability distribution. In the present embodiment, the four RFID tags 41 affixed to the pallet 40 (that is, affixed in an identified mutual positional relationship) are detected, their positions are measured, and the position of the center of the pallet 40 is estimated from the measured positions of the RFID tags 41 (hereinafter referred to as detected positions) on the basis of the above probability distribution.

Figure 4:
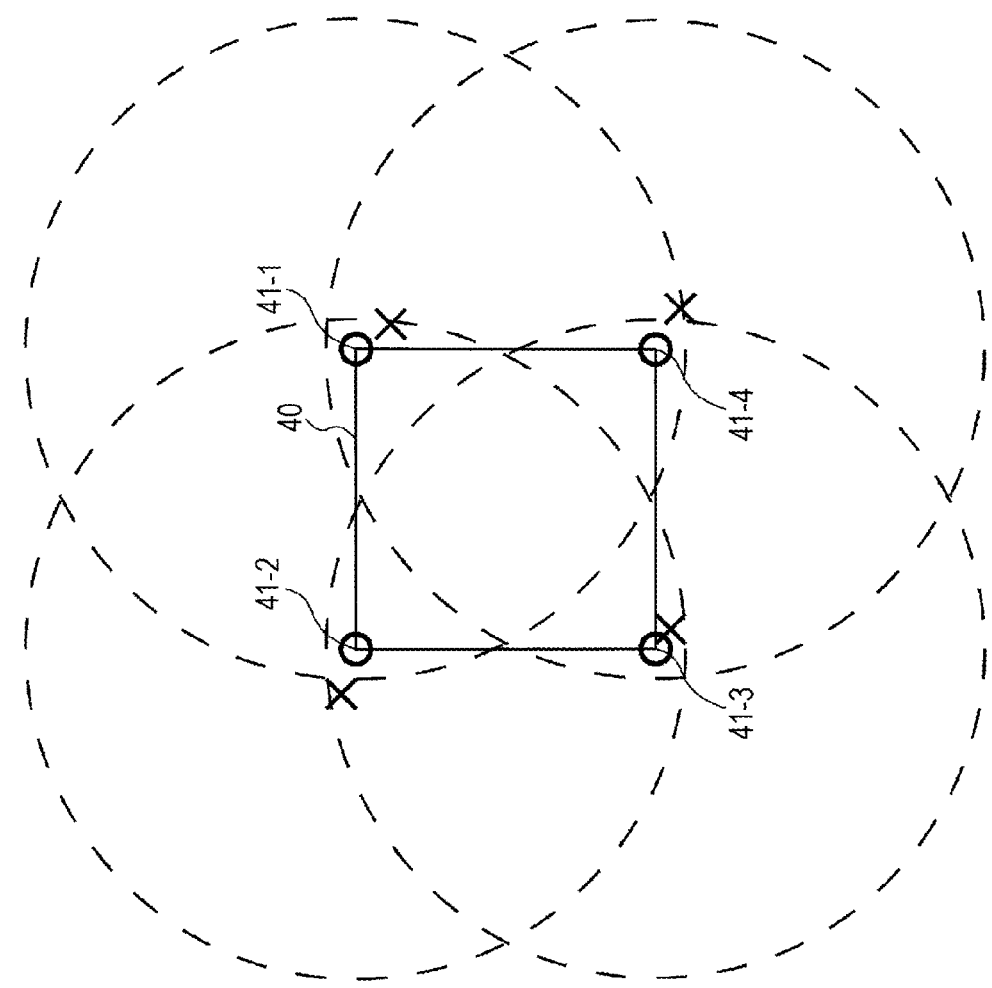
FIG. 4 is an illustration for describing measurement errors in detected positions of RFID tags, in accordance with embodiments of the present invention.

FIG. 4 is an illustration for describing measurement errors in detected positions of the RFID tags 41, in accordance with embodiments of the present invention. Actual measurement errors in detected positions occur in a three-dimensional space. However, for the sake of simplification, errors occurring in a two-dimensional plane are described in the illustrated example.

In FIG. 4, the actual position of each of the RFID tags 41-1, 41-2, 41-3, and 41-4 affixed to the four corners of the pallet 40 is indicated by a circle "O". An example of the detected position of each of the RFID tags 41-1, 41-2, 41-3, and 41-4 measured from a result of reception of radio waves by the receiving unit 20 is indicated by a cross "x". The range in which the distribution of measurement errors for each of the RFID tags 41-1, 41-2, 41-3, and 41-4 extends (hereinafter referred to as error distribution range) is indicated by a broken line.

Here, the actual positions of the RFID tags 41-1, 41-2, 41-3, and 41-4 arranged at the four corners of the pallet 40 form a square of side 1 m. That is, the distance between the RFID tags 41-1 and 41-2, that between the RFID tags 41-2 and 41-3, that between the RFID tags 41-3 and 41-4, and that between the RFID tags 41-4 and 41-1 are 1 m. When a line is imaginarily drawn between the RFID tags 41 in each set, the angle between the neighboring lines is 90°.

In FIG. 4, the detected position of each of the RFID tags 41-1, 41-2, 41-3, and 41-4 can occur within the error distribution range centered around the corresponding actual position indicated by the circle "O". It is to be noted that the probability of occurrence of the detected position (probability of detection of the RFID tag 41) varies depending on the distance from the actual position. Generally, the probability of detection of the RFID tag 41 increases as the distance from the actual position reduces, and the probability of detection of the RFID tag 41 reduces as the distance from the actual position increases. Accordingly, the position of the center of the pallet 40 is estimated from the detected position of each of the RFID tags 41-1, 41-2, 41-3, and 41-4 using this error probability distribution in position detection. An example of a used specific estimating technique can be a maximum likelihood estimation approach. The error probability distribution in position detection varies according to the type of the RFID tag 41, the performance of the receiving unit 20, and other factor, and thus it is required to be measured in advance.

Figure 5:
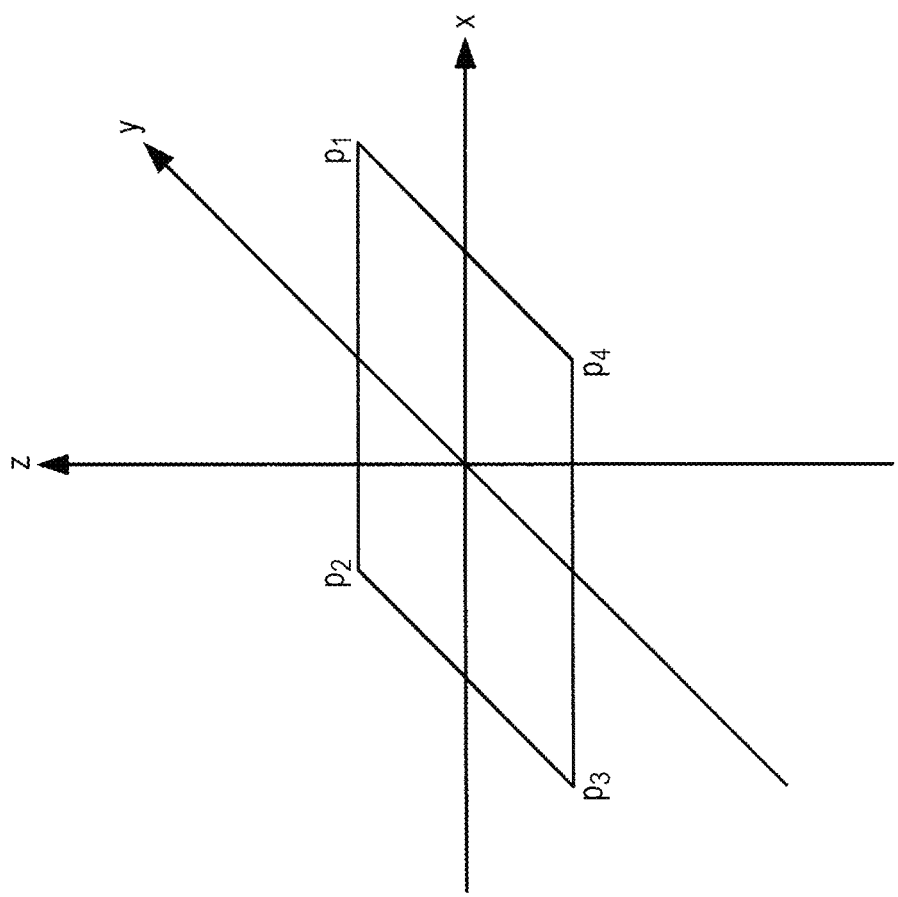
FIG. 5 is an illustration for describing a method of estimating the position of a pallet using a maximum likelihood estimation approach, in accordance with embodiments of the present invention.

FIG. 5 is an illustration for describing a method of estimating the position of the pallet 40 using a maximum likelihood estimation approach, in accordance with embodiments of the present invention.

In the example illustrated in FIG. 5, three-dimensional coordinates (x, y, z) of a Cartesian coordinate system are set in a target space. The point of origin is the position of the center of the pallet 40, and the actual positions of the RFID tags 41-1, 41-2, 41-3, and 41-4 are $p_1$, $p_2$, $p_3$, and $p_4$, respectively.

Here, the coordinate values of $p_1$, $p_2$, $p_3$, and $p_4$ can be represented as follows:

$$p = \begin{pmatrix} x \\ y \\ z \end{pmatrix}, p_1 = \begin{pmatrix} 1 \\ 1 \\ 0 \end{pmatrix}, p_2 = \begin{pmatrix} -1 \\ 1 \\ 0 \end{pmatrix}, p_3 = \begin{pmatrix} -1 \\ -1 \\ 0 \end{pmatrix},$$

$$p_4 = \begin{pmatrix} 1 \\ -1 \\ 0 \end{pmatrix},$$

[Equation 1]

The translation vector S and Euler angles $\phi$, $\theta$, and $\psi$ can be represented as follows:

$$S = \begin{pmatrix} S_x \\ S_y \\ S_z \end{pmatrix}$$

[Expression 2]

$$R_1(\phi) = \begin{pmatrix} \cos\phi & -\sin\phi & 0 \\ \sin\phi & \cos\phi & 0 \\ 0 & 0 & 1 \end{pmatrix},$$

$$R_2(\theta) = \begin{pmatrix} 1 & 0 & 0 \\ 0 & \cos\theta & -\sin\theta \\ 0 & \sin\theta & \cos\theta \end{pmatrix},$$

$$R_3(\psi) = \begin{pmatrix} \cos\psi & -\sin\psi & 0 \\ \sin\psi & \cos\psi & 0 \\ 0 & 0 & 1 \end{pmatrix}$$

wherein $R_1(\phi)$, $R_2(\theta)$, and $R_3(\psi)$ are rotation matrices for rotational angles $\phi$, $\theta$, and $\psi$ around respective axes of the Cartesian coordinate system, and wherein Sx, Sy, and Sz are respective x, y, and z components of the translation vector S.

Next, the positions $'p_1$, $'p_2$, $'p_3$, and $'p_4$ estimated by maximum likelihood as the actual positions of the RFID tags 41-1, 41-2, 41-3, and 41-4, respectively, can be represented by the following expressions.

$$'p_1 = (p_1 + S) R_1(\phi) R_2(\theta) R_3(\psi)$$

$$'p_2 = (p_2 + S) R_1(\phi) R_2(\theta) R_3(\psi)$$

$$'p_3 = (p_3 + S) R_1(\phi) R_2(\theta) R_3(\psi)$$

$$'p_4 = (p_4 + S) R_1(\phi) R_2(\theta) R_3(\psi) \quad \text{[Expression 3]}$$

There are N RFID tags 41 affixed to the pallet 40 and $P('p_n | \underline{p_n})$ is a probability that the estimated position of RFID tag n is the vector $'p_n$ if the detected position of RFID tag n is the vector $p_n$ for n=1, 2, ... N. The values of $S_x$, $S_y$, $S_z$, $\phi$, $\theta$, and $\psi$ can be determined from a result of detection by maximizing a likelihood function $L = P('p_1 | \underline{p_1}) \cdot P('p_2 | \underline{p_2}) \cdot P('p_3 | \underline{p_3}) \cdot P('p_4 | \underline{p_4})$ with respect to $S_x$, $S_y$, $S_z$, $\phi$, $\theta$, and $\psi$, wherein $P('p_1 | \underline{p_1})$, $P('p_2 | \underline{p_2})$, $P('p_3 | \underline{p_3})$, and $P('p_4 | \underline{p_4})$ are specified probability functions.

$$\text{Maximize}_{(S_x, S_y, S_z, \phi, \theta, \psi)} P('p_1 | \underline{p_1}) \cdot P('p_2 | \underline{p_2}) \cdot P('p_3 | \underline{p_3}) \cdot P('p_4 | \underline{p_4}) \quad \text{[Expression 4]}$$

wherein $\underline{p_1}$, $\underline{p_2}$, $\underline{p_3}$, and $\underline{p_4}$ are the detected (i.e., measured via the system of FIG. 1) positions of the RFID tags 41-1, 41-2, 41-3, and 41-4, respectively.

As described above, in the present embodiment, the position of the pallet 40 is estimated on the basis of the detected positions of the four RFID tags 41 affixed to the pallet 40 in an identified mutual positional relationship. Thus the position of the pallet 40 can be estimated with an accuracy twice ($\sqrt{4}$ times) higher than the accuracy for a detected position of the single RFID tag 41. In the present embodiment, the use of a maximum likelihood estimation approach in estimating the position of the pallet 40 enables determining the Euler angles $\phi$, $\theta$, and $\psi$ with respect to the reference positional relationship of the four RFID tags 41. Thus the attitude of the pallet 40 with respect to the reference positional relationship of the four RFID tags 41 can be estimated. The attitude of the pallet 40 can be represented as, for example, the direction of the normal to a plane identified by the four RFID tags 41 affixed to the pallet 40 (e.g., a plane that contains the four RFID tags 41) and an angle of rotation around the normal.

In the present embodiment, a modification in which the RFID tag 41 is also affixed to an item (thing) placed on the pallet 40 and position detection is conducted may be made. In that modification, because of measurement errors in detection of the RFID tag 41, the detected position of the RFID tag 41 affixed to the item may deviate from the estimated position of the pallet 40. In this case, because the accuracy for an estimated position of the pallet 40 in the present embodiment is higher than the accuracy for a detected position of the single RFID tag 41, the detected position of the item may be corrected on the basis of the estimated position of the pallet 40.

In the present embodiment, the position of the pallet 40 is estimated on the basis of the positions of the RFID tags 41 using a maximum likelihood estimation approach, as described above. However, the technique for estimating the position of the pallet 40 is not limited to the above estimation. For example, in the present embodiment, a case where the RFID tag 41 is affixed on each of the four corners of the square pallet 40, the position of the center of the pallet 40 is estimated on the basis of their positions, and only the coordinate values of the position of the center of the pallet 40 is required to be obtained is discussed. In this case, the coordinate values of the position of the center, or other reference point, of the pallet 40 may also be calculated by averaging of the coordinate values of the four RFID tags 41. With such a technique, the accuracy for the coordinate values is also twice ($\sqrt{4}$ times) higher than the accuracy for the detected position of the single RFID tag 41.

In the present embodiment, the position of the pallet 40 being an object whose position is to be detected is estimated on the basis of the detected positions of the four RFID tags 41. Alternatively, a configuration in which the position of an object is estimated using three or less or five or more RFID tags 41 affixed in an identified mutual positional relationship and in an identified positional relationship with the object may also be made. In this case, the accuracy for an estimated position of an object can increase with an increase in the number of RFID tags 41.

As described above, in the present embodiment, the planar pallet 40 is an object whose position is to be detected. If a storage member having a certain height (depth), such as a basket or a box, is an object whose position is to be detected, the RFID tag 41 may be affixed on each of the four corners of each of the bottom and the top of the object and thus the position of the object may be estimated on the basis of the detected positions of the eight RFID tags 41 in total. In the present embodiment, the pallet 40 on which items (things) are stacked when it is used is an object whose position is to be detected. Alternatively, a configuration in which the RFID tag 41 is affixed to an item itself and the position of the item itself is estimated may be made. The present embodiment is also applicable to other various systems configured to detect the position of an object provided with RFID tags.

Figure 6:
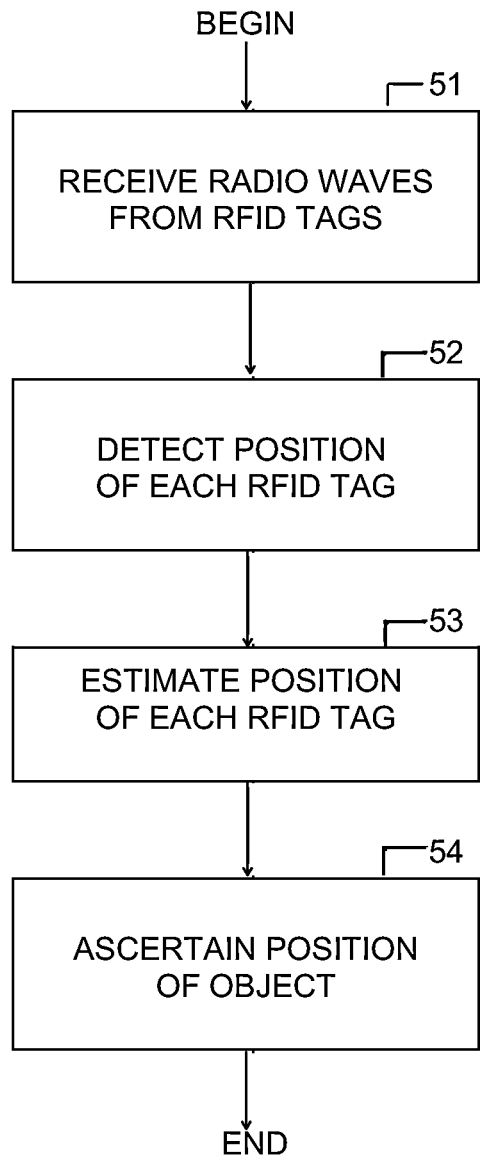
FIG. 6 is a flow chart describing a method for estimating a position of an object, in accordance with embodiments of the present invention.

FIG. 6 is a flow chart describing a method for estimating a position of an object (e.g., the pallet 40), in accordance with embodiments of the present invention. The method includes steps 51-54.

Step 51 receives, by the receiving unit 20, a radio wave from each radio frequency identification (RFID) tag 41 of N RFID tags affixed to the object at different positions at the object, wherein N is at least 2.

Step 52 detects, by the receiving unit 20 from the received radio waves, a position of each RFID tag.

Step 53 estimates, by the processor 33 of the control unit 30, a position of each RFID tag from analysis of the detected positions, wherein the estimating comprises utilizing, for n=1, 2, ..., N, a specified probability function $P('p_n | p_n)$ denoting a probability that the estimated position of RFID tag n is $'p_n$ if the detected position of RFID tag n is $p_n$, and wherein $'p_n$ and $p_n$ are vectors from an origin of a coordinate system to the detected position and the estimated position, respectively, of the RFID tag n.

In step 54, the processor 33 ascertains the position of the object from analysis of the estimated positions.

In one embodiment, for n=1, 2, ..., N, $'p_n$ deviates from $p_n$ by a displacement vector S and a set A of rotational angles, wherein estimating the position of each RFID tag comprises utilizing the probability function $P('p_n | p_n)$ to determine S and A.

In one embodiment, the coordinate system is a three dimensional Cartesian coordinate system having x, y, and z axes, wherein the displacement vector S has components $S_x$, $S_y$, and $S_z$ along the x, y, and z axes, wherein the rotational angles in the set A are Eulerian angles $\phi$, $\theta$, and $\psi$ around respective axes of the coordinate system, and wherein estimating the position of each RFID tag comprises determining values of $S_x$, $S_y$, $S_z$, $\phi$, $\theta$, and $\psi$ by maximizing a likelihood function L of $P('p_n | p_n)$ for n=1, 2, ..., N with respect to $S_R$, $S_y$, $S_z$, $\phi$, $\theta$, and $\psi$.

In one embodiment, $L=P('p_1|p'_{\underline{1}}) \cdot P('p_2|p_{\underline{2}}) \cdot \ldots \cdot P('p_N|p_{\underline{N}})$.

In one embodiment, $'p_n=(p_{\underline{n}}+S)\,R_1(\phi)\,R_2(\theta)\,R_3(\psi)$ for $n=1, 2, \ldots, N$, wherein $R_1(\phi)$, $R_2(\theta)$, and $R_3(\psi)$ are respective rotation matrices for $\phi$, $\theta$, and $\psi$.

In one embodiment, ascertaining the position of the object comprises determining a reference point in the object by calculating the reference point as an average of $'p_1$, $'p_2$, ... and $'p_n$ for $n=1, 2, \ldots, N$.

In one embodiment, before the radio wave from each RFID tag is received, the transmitting unit 10 transmits radio signals, under control of the control unit 30, to the N RFID tags 41 to trigger each RFID tag to transmit the radio wave from each RFID tag that is subsequently received for detecting the position of each RFID tag.

It is apparent from the scope of claims that embodiments in which various changes or improvements are made to the above-described embodiment are also included in the technical scope of the present invention.

What is claimed is:

1. A method for estimating a position of an object, said method comprising:
   receiving a radio wave from each radio frequency identification (RFID) tag of N RFID tags affixed to the object at different positions at the object, wherein N is at least 2;
   detecting, from the received radio waves, a position of each RFID tag;
   estimating, by a processor, a position of each RFID tag from analysis of the detected positions, wherein said estimating comprises utilizing, for $n=1, 2, \ldots, N$, a specified probability function $P('p_n|p_{\underline{n}})$ denoting a probability that the estimated position of RFID tag n is $'p_{\underline{n}}$ if the detected position of RFID tag n is $p_{\underline{n}}$, and wherein $'p_n$ and $p_{\underline{n}}$ are vectors from an origin of a coordinate system to the detected position and the estimated position, respectively, of the RFID tag n; and
   said processor ascertaining the position of the object from analysis of the estimated positions.

2. The method of claim 1, wherein for $n=1, 2, \ldots, N$, $'p_n$ deviates from $p_{\underline{n}}$ by a displacement vector S and a set A of rotational angles, and wherein said estimating the position of each RFID tag comprises utilizing the probability function $P('p_n|p_{\underline{n}})$ to determine S and A.

3. The method of claim 2, wherein the coordinate system is a three dimensional Cartesian coordinate system having x, y, and z axes, wherein the displacement vector S has components $S_x$, $S_y$, and $S_z$ along the x, y, and z axes, wherein the rotational angles in the set A are Eulerian angles $\phi$, $\theta$, and $\psi$ around respective axes of the coordinate system, and wherein said estimating the position of each RFID tag comprises determining values of $S_x$, $S_y$, $S_z$, $\phi$, $\theta$, and $\psi$ by maximizing a likelihood function L of $P('p_n|p_{\underline{n}})$ for $n=1, 2, \ldots, N$ with respect to $S_x$, $S_y$, $S_z$, $\phi$, $\theta$, and $\psi$.

4. The method of claim 3, wherein $L=P('p_1|p_{\underline{1}}) \cdot P('p_2|p_{\underline{2}}) \cdot \ldots \cdot P('p_N|p_{\underline{N}})$.

5. The method of claim 4, wherein $'p_n=(p_{\underline{n}}+S)\,R_1(\phi)\,R_2(\theta)\,R_3(\psi)$ for $n=1, 2, \ldots, N$, and wherein $R_1(\phi)$, $R_2(\theta)$, and $R_3(\psi)$ are respective rotation matrices for $\phi$, $\theta$, and $\psi$.

6. The method of claim 5, wherein $$S = \begin{pmatrix} S_x \\ S_y \\ S_z \end{pmatrix}$$

-continued $$R_1(\phi) = \begin{pmatrix} \cos\phi & -\sin\phi & 0 \\ \sin\phi & \cos\phi & 0 \\ 0 & 0 & 1 \end{pmatrix},$$

$$R_2(\theta) = \begin{pmatrix} 1 & 0 & 0 \\ 0 & \cos\theta & -\sin\theta \\ 0 & \sin\theta & \cos\theta \end{pmatrix},$$

$$R_3(\psi) = \begin{pmatrix} \cos\psi & -\sin\psi & 0 \\ \sin\psi & \cos\psi & 0 \\ 0 & 0 & 1 \end{pmatrix}.$$

7. The method of claim 1, wherein said ascertaining the position of the object comprises determining a reference point in the object by calculating the reference point as an average of $'p_1$, $'p_2$, ... and $'p_n$ for $n=1, 2, \ldots, N$.

8. The method of claim 1, said method further comprising:
   after said ascertaining the position of the object, transmitting the ascertained position of the object to a server device for storage of the ascertained the position of the object in a storage means of the server device.

9. The method of claim 1, said method further comprising:
   before said receiving the radio wave from each RFID tag, transmitting radio signals to the N RFID tags to trigger each RFID tag to transmit the radio wave from each RFID tag that is subsequently received for said detecting the position of each RFID tag.

10. A system for estimating a position of an object, said system comprising:
    means for receiving a radio wave from each radio frequency identification (RFID) tag of N RFID tags affixed to the object at different positions at the object, wherein N is at least 2;
    means for detecting, from the received radio waves, a position of each RFID tag;
    means for estimating a position of each RFID tag from analysis of the detected positions, wherein said estimating comprises utilizing, for $n=1, 2, \ldots, N$, a specified probability function $P('p_n|p_{\underline{n}})$ denoting a probability that the estimated position of RFID tag n is $'p_{\underline{n}}$ if the detected position of RFID tag n is $p_{\underline{n}}$, and wherein $'p_n$ and $p_{\underline{n}}$ are vectors from an origin of a coordinate system to the detected position and the estimated position, respectively, of the RFID tag n; and
    means for ascertaining the position of the object from analysis of the estimated positions.

11. A system comprising a receiving unit and a control unit collectively configured to perform a method for estimating a position of an object, said receiving unit coupled to the control unit, said method comprising:
    said receiving unit receiving a radio wave from each radio frequency identification (RFID) tag of N RFID tags affixed to the object at different positions at the object, wherein N is at least 2;
    said receiving unit detecting, from the received radio waves, a position of each RFID tag;
    estimating, by a processor of the control unit, a position of each RFID tag from analysis of the detected positions, wherein said estimating comprises utilizing, for $n=1, 2, \ldots, N$, a specified probability function $P('p_n|p_{\underline{n}})$ denoting a probability that the estimated position of RFID tag n is $'p_{\underline{n}}$ if the detected position of RFID tag n is $p_{\underline{n}}$, and wherein $'p_n$ and $p_{\underline{n}}$ are vectors from an origin of a coordinate system to the detected position and the estimated position, respectively, of the RFID tag n; and said processor ascertaining the position of the object from analysis of the estimated positions.

12. The system of claim 11, wherein for n=1, 2, ..., N, $'p_n$ deviates from $p_n$ by a displacement vector S and a set A of rotational angles, and wherein said estimating the position of each RFID tag comprises utilizing the probability function $P('p_n|p_n)$ to determine S and A.

13. The system of claim 12, wherein the coordinate system is a three dimensional Cartesian coordinate system having x, y, and z axes, wherein the displacement vector S has components $S_x$, $S_y$, and $S_z$ along the x, y, and z axes, wherein the rotational angles in the set A are Eulerian angles $\phi$, $\theta$, and $\psi$ around respective axes of the coordinate system, and wherein said estimating the position of each RFID tag comprises determining values of $S_x$, $S_y$, $S_z$, $\phi$, $\theta$, and $\psi$ by maximizing a likelihood function L of $P('p_n|p_n)$ for n=1, 2, ..., N with respect to $S_x$, $S_y$, $S_z$, $\phi$, $\theta$, and $\psi$.

14. The system of claim 13, wherein $L=P('p_1|p_1) \cdot P('p_2|p_2) \cdot \ldots \cdot P('p_N|p_N)$.

15. The system of claim 14, wherein $'p_n=(p_n+S) R_1(\phi) R_2(\theta) R_3(\psi)$ for n=1, 2, ..., N, and wherein $R_1(\phi)$, $R_2(\theta)$, and $R_3(\psi)$ are respective rotation matrices for $\phi$, $\theta$, and $\psi$.

16. The system of claim 15, wherein $$S = \begin{pmatrix} S_x \\ S_y \\ S_z \end{pmatrix}$$

$$R_1(\phi) = \begin{pmatrix} \cos\phi & -\sin\phi & 0 \\ \sin\phi & \cos\phi & 0 \\ 0 & 0 & 1 \end{pmatrix},$$

$$R_2(\theta) = \begin{pmatrix} 1 & 0 & 0 \\ 0 & \cos\theta & -\sin\theta \\ 0 & \sin\theta & \cos\theta \end{pmatrix},$$

$$R_3(\psi) = \begin{pmatrix} \cos\psi & -\sin\psi & 0 \\ \sin\psi & \cos\psi & 0 \\ 0 & 0 & 1 \end{pmatrix}.$$

17. The system of claim 11, wherein said ascertaining the position of the object comprises determining a reference point in the object by calculating the reference point as an average of $'p_1, 'p_2, \ldots$ and $'p_n$ for n=1, 2, ..., N.

18. The system of claim 11, said method further comprising:
after said ascertaining the position of the object, said control unit transmitting the ascertained position of the object to a server device for storage of the ascertained the position of the object in a storage means of the server device.

19. The system of claim 11, said system further comprising a transmitting unit coupled to the control unit, said method further comprising:
before said receiving the radio wave from each RFID tag, said transmitting unit transmitting radio signals, under control of the control unit, to the N RFID tags to trigger each RFID tag to transmit the radio wave from each RFID tag that is subsequently received for said detecting the position of each RFID tag.

20. The system of claim 11, wherein N=8, wherein the object is a three-dimensional pallet having a shape of a rectangular solid with 8 corners, and wherein the 8 RFID tags are respectively positioned at the 8 corners of the rectangular solid.

* * * * *